SEISMIC RADIATOR

Filed Dec. 1, 1966

John C. Eberlan
INVENTOR.

BY Bertram H. Mann
ATTORNEY

SEISMIC RADIATOR
Filed Dec. 1, 1966
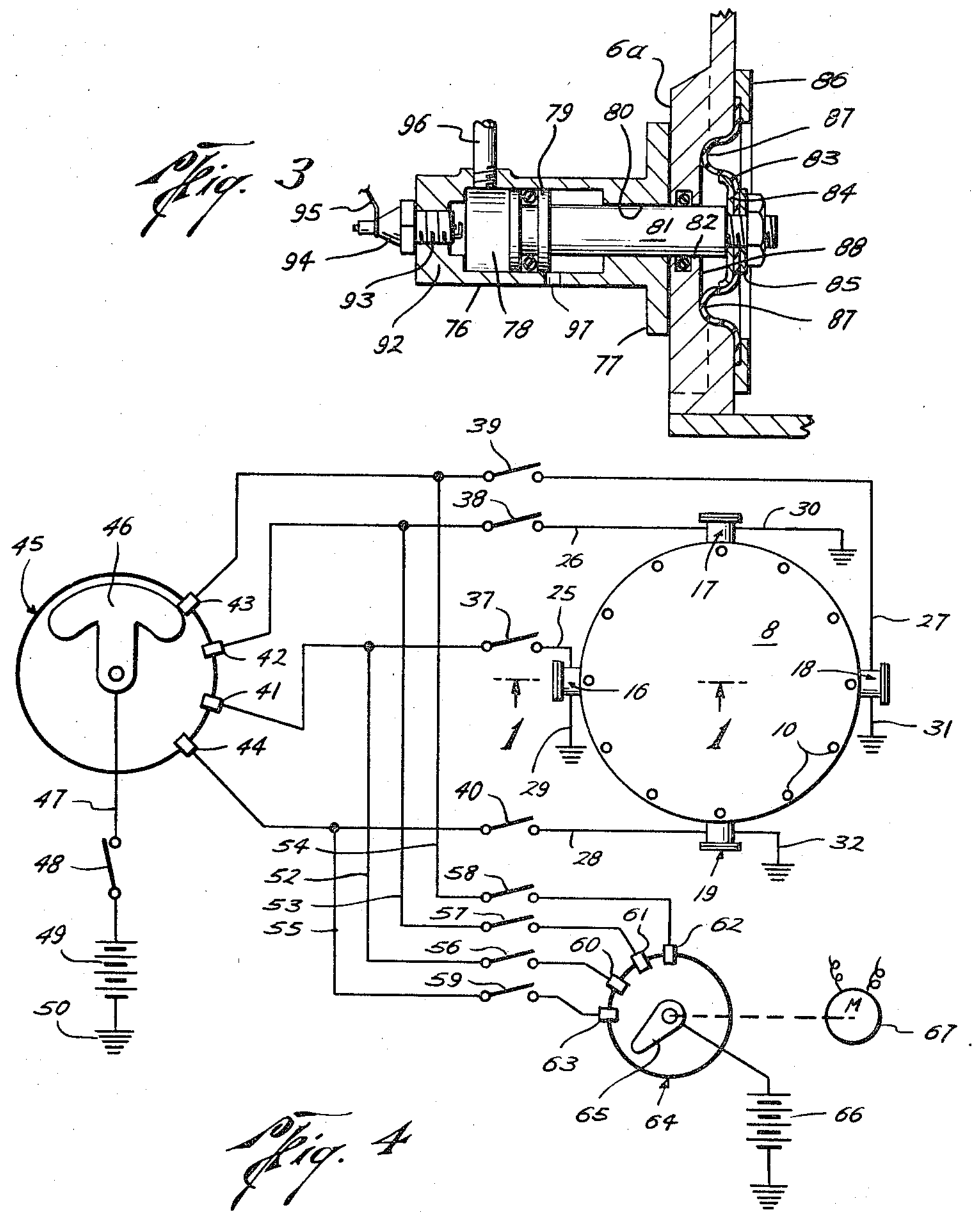
John C. Eberlan
INVENTOR.
BY Bertram H. Mann
ATTORNEY United States Patent Office 3,370,672

Patented Feb. 27, 1968

3,370,672

SEISMIC RADIATOR

John C. Eberlan, Houston, Tex., assignor, by mesne assignments, to McCollum Laboratories, Inc., Houston, Tex., a corporation of Texas Filed Dec. 1, 1966, Ser. No. 598,254
2 Claims. (Cl. 181—.5)

ABSTRACT OF THE DISCLOSURE

A seismic radiator including a fluid-tight casing to be planted on the ground or in water and having a reciprocating inertia member therein forming a pulsing chamber filled with a hydraulic fluid. Primary actuators are mounted in the peripheral wall of the chamber for applying impacts through the hydraulic fluid to the inertia member and radiating plate at the bottom of the chamber casing.

*Specification*

This invention relates to seismic pulse radiators, particularly of the hydrodynamic type.

Patent No. 3,242,459, issued Mar. 22, 1966, in the name of Burton McCollum, covers a hydrodynamic type of seismic radiator consisting of a generally I-section inertia device which is slidable within a casing and serves as an inertia member. The casing is filled with hydraulic fluid through which seismic impulses, either individually or in trains, are applied to the inertia member and the casing by means of a relatively small, cylindrical, electromagnetically-operated plunger. There have been some difficulties with this prior device, particularly in the supporting and energizing of the primary plunger located, as it is, in the interior of the casing. Furthermore, this device is relatively inflexible in that it may be designed to create impulses throughout a particular, relatively narrow range of intensities and frequencies.

Accordingly, an object of the present invention is to provide a hydrodynamic type seismic radiator in which the primary actuating means is located in readily accessible position at the periphery of the hydraulic casing.

Another object is to provide such a radiator having a plurality of primary impulsers and controls for selectively and individually actuating these impulsers so as to vary the intensity of the radiated impulses and also to produce either a single impulse of desired intensity or a series of sequential impulses forming a wave train of desired frequency.

Still another object is to provide a hydrodynamic type seismic vibrator which may utilize either an electromagnetic or gas explosion energized primary impulser.

These objects and others hereafter appearing are attained substantially in the accompanying drawings in which FIG. 1 is a half radial transverse section through an exemplary form of the novel radiator device;

FIG. 3 is a detailed radial transverse section somewhat enlarged and illustrating still another modification; and FIG. 4 is a schematic view of a radiator as illustrated in FIG. 1 with controls.

Figures 1, 2:
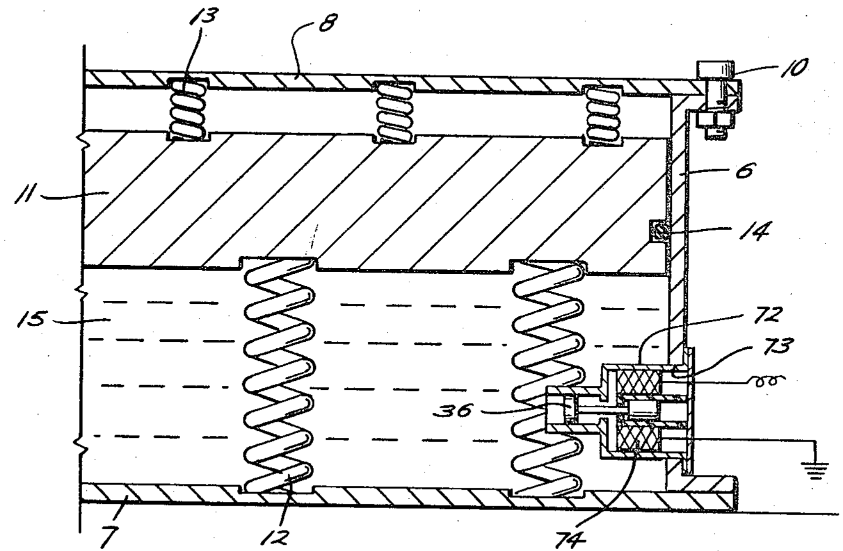
FIG. 2 is a similar view showing a modification.

According to the present invention, there is provided a fluid tight casing for planting on the ground or in water and in which an inertia member reciprocates. The working chamber between the inertia member and the bottom of the casing, the latter forming a radiator plate, is provided with a hydraulic charge which together with spring means maintains the inertia member resiliently centered in the casing. Mounted in the peripheral wall of the casing is a primary impulser, or a plurality of such impulsers, each consisting of a plunger, electromagnetically or otherwise actuated into and out of the working chamber to transmit a pulse to the inertia member and radiating plate, and thence into the radiating medium. Controls are provided whereby one or more of the primary impulsers is actuated to provide a single transient pulse or a series thereof to radiate a wave train.

The radiator device shown in half radial section in FIG. 1 and in plan view in FIG. 4 includes a fluid-tight casing formed of an upstanding, cylindrical side wall 6, a floor or bottom wall 7 constituting a radiating plate, and a top wall 8 bolted to flange 9 on the side wall, as at 10. A heavy, cylindrical inertia structure 11 is normally resiliently centered in the casing by means of relatively heavy bottom springs 12 and lighter top springs 13. The inertia structure has one or more peripheral O-rings 14 for sealingly engaging the casing side wall as it slides therealong. In normal use, working chamber 15 between the inertia structure and plate 7 is filled with a charge of hydraulic fluid which tends to assist springs 12 in supporting the inertia structure.

Mounted in the cylindrical side wall 6 and exposed to working chamber 15 are primary actuator structures 16, 17, 18, and 19 each including, as shown in FIG. 1, a casing 20 enclosing a solenoid coil 21 and having an annular base flange 22 sealingly secured to the outer face of casing wall 6. A hollow boss 23 projects through a hole 24 in the cylindrical wall and is open at its inner end as shown. The solenoid coils are provided with energizing leads 25–28 and ground leads 29–32.

Each solenoid armature as 33 is slidably received within a tube 34 extending axially through casing 20 and coil 21. A stem 35 projects from armature 33 axially through tube 34 and, at its inner extremity, carries a plunger 36 which sealingly slides along the inner wall of boss 23. Any number of these small primary actuators may be provided instead of the four shown in FIG. 4.

With further reference to FIG. 4, the primary actuators 16–19 are connected by their hot leads 25–28 through switches 37–40 to terminals 41–44 of a control switch 45. Bridging arm 46 of the switch is conected by a lead 47 through a master switch 48 to a source of power, in this instance, a battery 49 grounded at 50. The curved bridging arm 46 is arranged for manual or other manipulation to energize one, two, three, or four of the terminals 41–44, hence energizing the primary actuators, except for switches 37–40. These latter switches may be closed singly or in any grouping, or in rotation.

The primary actuators are also connected by leads 52–55 with switches 56–59 to terminals 60–63 of switch 64 having a rotating terminal 65 powered from battery 66 and actuated by a motor 67. Switches 56–59 may be ganged, if desired, for joint operation.

In operation, after a decision is made as to the pulse intensity desired, the proper number of switch terminals 41–44 are energized, as explained, by means of bridging contact 46 and the corresponding switches 37–40 closed and switches 56–59 opened. A suitable ganging arrangement will be desirable for actuating switches 37–40 in unison. Upon such energization of one or more of the primary actuators 16–19, the plungers 36 thereof will be forced into working chamber 15, thus displacing a quantity of the hydraulic liquid and transmitting an impulse through the liquid to the inertia structure 11, which is elevated proportionately, and radiating plate 7. The pulse will be transmitted from the plate 7 into the earth or other radiating medium, for instance, water.

On the other hand, if desired, two or more of the primary actuators may be energized in sequence to cause the radiation of a wave train. This is achieved by closing switches 56–59 and actuating rotating contact 65 to energize the primary actuators in rapid succession. Alternatively, all of the primary actuators may be periodically operated in unison or in any desired grouping. The present radiator device is particularly advantageous for such use to radiate truncated wave trains in view of the self-damping effect of the hydraulic fluid in working chamber 15. If desired, the springs 12 and 13 may be designed in proportion to the impulsing in the hydraulic fluid and the mass of the inertia structure to cause compacting of springs 13 and transmitting of a counter impulse to casing 8, 6, 7 for terminating the downward positive impulse initially created, as explained and covered in McCollum Patent No. 3,260,327. Where the instrument is used to radiate wave trains, it is, of course, desirable to take advantage as far as possible of the natural frequency of the system.

The form in FIG. 2 is similar to that in FIG. 1, and corresponding parts are given the same reference numerals. However, in this form, solenoid casing 72 extends through a larger opening 73 in the casing side wall 6 into the interior of working chamber 15, so that substantially the entire primary actuator device is located within the confines of the casing. Plunger 36 has the same effect as the corresponding part in FIG. 1 upon energization of solenoid 74.

FIG. 3 illustrates another form of primary actuator device including a tubular body 76 having a base flange 77 sealingly secured to casing wall *6a* so that the body projects outwardly from the casing. Within body 76 is a stepped chamber including a firing chamber portion 78 in which a piston 79 slides, and a smaller portion 80 slidably receiving stem 81 projecting from the piston. Inner chamber portion 80 in the assembly is aligned with a similarly-sized aperture 82 in casing wall *6a*, and stem 81 projects through the aligned apertures 80 and 82. At the inner end of stem 81 there is secured a flexible but rugged diaphragm 83 by means of back-up washers 84 and 85. The periphery of diaphragm 83 is sealingly secured to the inner face of casing *6a* as by means of clips 86 and has intermediate loop or bight portions 87 extending into casing wall recess 88 to provide for flexing of the diaphragm.

The outer wall 92 of tubular body 76 has a threaded aperture 93 for receiving a spark plug 94 with an energizing lead 95. Leading into chamber 78 is a fueling tube or manifold branch 96 through which a combustible mixture, as of oxygen and butane or other gas, is supplied from a suitable carburetor (not shown). Reference is made to McCollum Patent No. 3,260,327 for suitable fuel and ignition control means which, in themselves, do not constitute the present invention. Located intermediately in the wall of tubular body 76 are exhaust ports 97 through which exhaust from firing chamber 78 escapes in two-cycle operation of the gas-exploded primary actuator.

In this form, as in the previous forms, multiple primary actuators may be provided, and these will be controlled for the operation of one or any number of such primary actuators simultaneously or in sequence. However, the forms in FIGS. 1, 2, and 4 are better adapted for radiating wave trains.

Accordingly, the herein-disclosed radiators have the multiplying advantages of the large hydraulic working chamber 15, while the primary actuators are handily positioned both for installation and inspection and for operation. Furthermore, provision is made for considerable variation in the impulse intensity so that a single radiator instrument may have substantially wider use than is the case with the radiators of the above-mentioned McCollum patents. It will be understood that the control provided with the form in FIG. 3 will be equipped with suitable ignition and fuel distributors and manifolding, which can be readily designed by those skilled in this art, particularly in view of the teaching of McCollum Patent No. 3,260,327. The invention may be modified in various respects as will occur to those skilled in the art, and the exclusive use of all modifications as come within the scope of the appended claims is contemplated.

I claim:

1. A seismic radiator comprising a casing having walls including a radiating plate member, an inertia member movable in said casing and forming therein an expansible and contractible working chamber between said inertia and plate members, an hydraulic charge in said working chamber, means for resiliently centering said inertia member in said casing, a plurality of movable wall elements sealingly mounted in said casing walls and exposed to said charge, and means outside said walls for individually and selectively shifting said wall elements to apply impulses through said charge to said inertia and radiating plate members.

2. A seismic radiator as described in claim 1 including means for shifting said movable wall elements in varying groupings to vary the intensity of the radiation.

References Cited

UNITED STATES PATENTS

| | | | |
|---|---|---|---|
| 2,203,140 | 6/1940 | Green | 181—.5 |
| 2,281,751 | 5/1942 | Cloud | 181—.5 |
| 2,728,405 | 12/1955 | Brant | 181—.5 |
| 3,056,104 | 9/1962 | De Kanski et al. | 181—.5 |
| 3,189,121 | 6/1965 | Vander Stoep | 181—.5 |
| 3,221,833 | 12/1965 | Malmberg | 181—.5 |

BENJAMIN A. BORCHELT, *Primary Examiner.*

G. H. GLANZMAN, *Assistant Examiner.*